Oct. 21, 1930.    R. E. FRICKEY ET AL    1,778,973
ARC WELDING SYSTEM
Filed Jan. 31, 1930
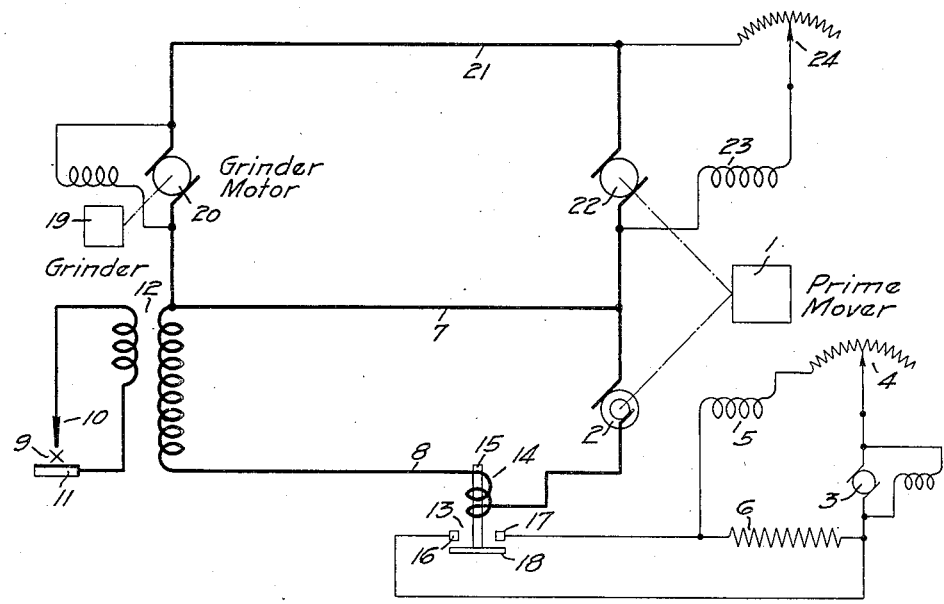
INVENTORS
Royal E. Frickey
Arion S. Kalenborn
BY
White, Prost, Flehr & Lothrop
ATTORNEYS.

Patented Oct. 21, 1930

1,778,973

UNITED STATES PATENT OFFICE

ROYAL E. FRICKEY, OF SAN FRANCISCO, AND ARION S. KALENBORN, OF REDWOOD CITY, CALIFORNIA, ASSIGNORS TO WELDING SERVICE, INC., OF SAN FRANCISCO, CALIFORNIA, A CORPORATION OF CALIFORNIA

ARC WELDING SYSTEM

Application filed January 31, 1930. Serial No. 424,861.

This invention relates to arc welding, and particularly to the use of arc welding for repairing or building up worn rail ends or rails of railroads. The subject matter claimed herein is a continuation in part of our co-pending application 752,870, filed November 29, 1924.

Railroad tracks are formed by laying rail sections end to end, and since account must be taken of the variation in length of the sections due to temperature changes, there is left a small space between adjacent rail ends. As the wheels of a train pass from one track section to another, the ends of the rails receive a severe hammering from the wheels; due to the fact that both rails do not flex in unison under the load. This hammering produces objectionable wear in time, and electric arc welding systems are utilized to build up the ends and thereby make the track section serviceable again for another long period. Arc welding may be also used in connecting the sections together electrically or for bonding.

But irrespective of the particular immediate use to which the welding system is put, the operation of such systems along the right-of-way prior to our invention has been cumbersome and expensive. The most convenient form of welding is by the aid of electricity; yet as heretofore practiced for steam railroad work, it is either unduly expensive or else dangerous. This is due to the fact that the welding operation must be performed in succession at spaced points corresponding to the places where the rail sections are joined. The electric power for the arc has been produced either by operating a generator near the scene of the work, or else from an overhead trolley. If a generator be operated, it must be moved up for each section, and this is time consuming, whether the equipment is mounted on a hand-car on the rails or on a tractor alongside the right of way. When the trolley is used the high voltages encountered form a serious hazard.

It is thus one of the objects of our invention to overcome these disadvantages and to make it possible to utilize electrical arc welding efficiently and safely for repairing the rails under all conditions.

It is still another object of our invention to ensure against dangerous voltage conditions on any part of the entire system.

Our invention possesses other advantages, some of which with the foregoing, will be set forth at length in the following description, where we shall outline in full that form of the invention which we have selected for illustration in the drawings accompanying and forming part of the present specification. Although we have shown but one embodiment of our invention in the drawings, we do not desire to be limited thereto, since the invention as defined in the claim may be embodied in other forms also.

Referring to the drawing:

The single figure is a wiring diagram illustrating one embodiment of our welding system.

Our invention in its preferred form employs a prime mover 1 to drive an alternating current generator 2, the generator being adapted to supply the electrical power consumed by the arc welding. This generator is so constructed as to supply substantially a constant current over a comparatively wide range of variation of the load impedance. This effect is useful to steady the arc load, and may be obtained for example by providing for a large armature reaction, which in turn may be produced by reducing the air gap between the field and armature structures. In order to supply the excitation for this generator 2, we show a small direct current exciter 3, adapted to be driven by the prime mover 1. This exciter supplies the field circuit of generator 2, comprising a variable resistor 4, the field winding 5, and another resistor 6. This latter resistor is arranged to be shunted out of the circuit at times, as explained hereinafter to provide the normal or working excitation.

The apparatus thus far described is preferably mounted on a light car, running on the rails for moving it from one place to another along the tracks. During the process of welding, the car is taken off the tracks to permit the passage of trains, and it must be again placed on the track when it is required to move the apparatus to a new location. It is one of the important features of our invention that the frequency of moving the apparatus is materially reduced over any other method, and there is a great saving of time thereby. This we accomplish by using portable cables 7 and 8 which extend from the generator 2 to the location where the welding is to be performed. These cables are preferably made up of comparatively short sections 26, say of 250 feet, so that they may be readily connected in series as required. By successively connecting more and more of these sections in cables 7 and 8, the distance between the generator 2 and the scene of operations can be increased as required.

Due to the fact that the arc 9 formed between the movable electrode 10 and the rail 11, must be operated at comparatively low voltage, of the neighborhood of 25 volts, it is evident that the use of such long cables as we have described between it and the generator 2 would cause too great a loss unless a prohibitively large amount of copper be utilized. In order to overcome this disadvantage, and yet make it feasible to extend cables 7 and 8 for a distance of a half-mile or more, the generator 2 is caused to produce a comparatively high voltage, which is transformed to a low value at the work, and which fluctuates as the arc length varies, to keep the current supplied substantially constant. By way of example only, the arc 9 may take about 200 amperes at 25 volts, and under these conditions of operation, a 4 to 1 reducing transformer 12 may be used, causing the generator 2 to supply about 100 volts. Of course as the arc lengthens, this voltage rises considerably but under normal arc conditions, there is no dangerous voltage between cables 7 and 8.

The cables 7 and 8 are extended or shortened however while the arc 9 is broken and inoperative. If under such circumstances no special provisions be made to reduce the voltage to a safe value, then the manipulation of cables 7 and 8 becomes dangerous. In order to prevent undue voltage rise, and in fact to reduce it even below the normal value, we utilize an automatic switch 13 to reduce the generator voltage whenever the arc 9 is broken or is unduly lengthened. The switch in this instance comprises a coil 14 responsive to changes in the generator current. This may be accomplished by inserting the coil 14 in series in either of cables 7 or 8. While the current consumption is above a definite value, the core 15 is pulled upwardly, and contacts 16 and 17 are bridged by the disc 18 carried by core 15. These contacts serve to short-circuit the resistor 6 in the field exciting circuit of generator 2, and thereby cause full excitation to exist. We preferably set the switch 13 so that it opens the circuit between contacts 16 and 17, at about when the arc breaks, which occurs when the secondary voltage is about double the normal operating value. The opening of the contacts 16, 17, causes a material reduction in the field excitation of generator 2, and this in turn causes the voltage generated thereby to be reduced to a safe value. The amount of reduction can be determined by choosing the value of resistor 6 properly.

Although we illustrate a system in which no impedance or inductance is used externally of generator 2, such an expedient could be utilized to provide a substantially constant current over the working range, in lieu of, or in combination with, the special design of generator 2.

The operation of the system as thus far described may now be summarized. After the apparatus has been moved to a location which is central as regards the work to be done from that position, the cables 7 and 8 are extended to their maximum capacity to reach to one of the farthermost rails to be operated upon. This may be done with safety even while prime mover 1 is in operation, for switch 13 is open and the generated voltage correspondingly low. After the cables are thus extended the arc 9 may be struck by touching electrode 10 to rail 11. This causes a sufficient current to flow to close switch 13 and full excitation is impressed on generator 2. Then the arc may be drawn by the welder to the optimum length. As soon as the repairing is completed, the arc 9 is broken; switch 13, opens, and the cables 7 and 8 are readjusted for the next rail. The operation may then be repeated.

It is evident that when half-mile cables 7 and 8 are used, the equipment need be moved only once to operate on a mile of track, because the cables may be extended to either side of the generator 2. Furthermore, when building up rail ends as described, it is necessary to smooth off the built-up end after the welding is completed. This can be accomplished by the aid of a grinder 19 diagrammatically illustrated, and operated by a motor 20. Another feature of our invention resides in the fact that we utilize one of the cables 7 or 8 (in which the coil 14 is not present) as a common return for both motor 20 and transformer 12. The other conductor for the motor circuit is shown at 21. The grinder motor 20 is preferably a direct current motor, and to supply energy thereto, we operate a small direct current generator 22, which may also be driven from the prime mover 1. This generator is shown as a shunt generator, having the field circuit consisting of the field winding 23 and a variable resistor 24.

The conductor or line 21 is made up in comparatively short sections 27, similar to conductors 7 and 8, so that it too may be adjusted to the proper length.

Since the current controlling reactance for the circuit between the generator and the primary of the transformer is located at the generator end of the portable conductor, the potential on the portable conductor during welding operations is prevented from becoming dangerously excessive.

We claim:

In an arc welding system, a step-down portable transformer having input and output terminals, a welding circuit connected to the output terminals of the transformer, a portable alternating current generator, and an electrical circuit connecting the generator with the input terminals of the transformer, said circuit including load controlling reactance and a long portable conductor extending between the generator and the transformer, said reactance being located at the generator end of the conductor to control the current applied to the conductor and to the welding circuit.

In testimony whereof, we have hereunto set our hands.

ROYAL E. FRICKEY
ARION S. KALENBORN.